(12) United States Patent
Kedzierski

(10) Patent No.: US 12,026,919 B2
(45) Date of Patent: Jul. 2, 2024

(54) CONTENT-BASED ENCODING OF DIGITAL IMAGES

(71) Applicant: RED HAT, INC., Raleigh, NC (US)

(72) Inventor: Marek Kedzierski, Warsaw (PL)

(73) Assignee: Red Hat, Inc., Raleigh, NC (US)

( * ) Notice: Subject to any disclaimer, the term of this patent is extended or adjusted under 35 U.S.C. 154(b) by 139 days.

(21) Appl. No.: 17/560,213

(22) Filed: Dec. 22, 2021

(65) Prior Publication Data
US 2023/0196623 A1  Jun. 22, 2023

(51) Int. Cl.
G06T 9/00 (2006.01)
G06T 1/60 (2006.01)
H04N 19/625 (2014.01)

(52) U.S. Cl.
CPC .................. *G06T 9/00* (2013.01); *G06T 1/60* (2013.01); *H04N 19/625* (2014.11)

(58) Field of Classification Search
None
See application file for complete search history.

(56) References Cited

U.S. PATENT DOCUMENTS

| | | | |
|---|---|---|---|
| 8,189,661 B2 | 5/2012 | Abdo et al. | |
| 8,837,824 B2 | 9/2014 | Fagg et al. | |
| 9,025,898 B2 | 5/2015 | Kamay et al. | |
| 9,210,434 B2 | 12/2015 | Zhu et al. | |
| 9,582,240 B2 | 2/2017 | Spracklen et al. | |
| 2005/0249277 A1* | 11/2005 | Ratakonda | H04N 19/119 375/240.18 |
| 2011/0228843 A1* | 9/2011 | Narroschke | H04N 19/80 375/E7.193 |
| 2016/0275682 A1* | 9/2016 | Natroshvili | G06T 7/85 |
| 2017/0163999 A1* | 6/2017 | Li | H04N 19/105 |
| 2021/0195197 A1* | 6/2021 | Kato | H04N 19/176 |
| 2023/0196114 A1* | 6/2023 | Hu | G06N 3/086 705/7.37 |

OTHER PUBLICATIONS

Shen, et al., "A High-Performance Remote Computing Platform." IEE 2009, 6 pages.

* cited by examiner

*Primary Examiner* — James A Thompson
*Assistant Examiner* — Kim Tranh T Tran
(74) *Attorney, Agent, or Firm* — Womble Bond Dickinson (US) LLP

(57) ABSTRACT

An example method may include identifying a first block of a first image, the first block comprising a plurality of pixel values, generating a frequency-based representation of the first block, where the frequency-based representation comprises a transformation matrix having a plurality of coefficients, where each coefficient specifies a weight of a respective frequency in the frequency-based representation of the first block, generating at least one frequency domain parameter of the first block in view of a sum of a plurality of the coefficients of the transformation matrix, generating a visual content classification value in view of the at least one frequency domain parameter of the first block, selecting, in view of a determination of whether the visual content classification value satisfies a visual content-specific threshold, an encoding, and generating, using the selected encoding, an encoded block in view of the first block.

18 Claims, 10 Drawing Sheets

```
┌─────────────────────────────────────────────────────────────┐
│ Identify a first block of a first image, the first block    │
│ comprising a plurality of pixel values                      │
│ 410                                                         │
└─────────────────────────────────────────────────────────────┘
                              ↓
┌─────────────────────────────────────────────────────────────┐
│ Generate a frequency-based representation of the first      │
│ block, wherein the frequency-based representation comprises │
│ a transformation matrix having a plurality of coefficients, │
│ wherein each coefficient specifies a weight of a            │
│ respective frequency in the frequency-based representation  │
│ of the first block                                          │
│ 420                                                         │
└─────────────────────────────────────────────────────────────┘
                              ↓
┌─────────────────────────────────────────────────────────────┐
│ Generate at least one frequency domain parameter of the     │
│ first block, wherein each frequency domain parameter of     │
│ the first block is generated in view of a sum of a          │
│ plurality of the coefficients of the transformation matrix  │
│ 430                                                         │
└─────────────────────────────────────────────────────────────┘
                              ↓
┌─────────────────────────────────────────────────────────────┐
│ Generate a visual content classification value in view of   │
│ the at least one frequency domain parameter of the first    │
│ block                                                       │
│ 440                                                         │
└─────────────────────────────────────────────────────────────┘
                              ↓
┌─────────────────────────────────────────────────────────────┐
│ Select, in view of a determination of whether the visual    │
│ content classification value satisfies a visual             │
│ content-specific threshold, an encoding                     │
│ 450                                                         │
└─────────────────────────────────────────────────────────────┘
                              ↓
┌─────────────────────────────────────────────────────────────┐
│ Generate, using the selected encoding, an encoded block in  │
│ view of the first block                                     │
│ 460                                                         │
└─────────────────────────────────────────────────────────────┘
                              ↓
┌─────────────────────────────────────────────────────────────┐
│ Cause an image comprising the encoded block to be a         │
│ rendered via an image rendering device                      │
│ 470                                                         │
└─────────────────────────────────────────────────────────────┘
```

FIG. 4

CONTENT-BASED ENCODING OF DIGITAL IMAGES

TECHNICAL FIELD

The present disclosure is generally related to computer graphics, and more particularly, to content-based encoding of digital images.

BACKGROUND

A remote desktop system can enable a client computer system to display screen content from a remote computer system and send input received at the client computer system to the remote computer system, so that a user interface of the remote computer system is presented on the client computer system. The client and remote computer systems can be at different physical locations. The remote desktop system thus enables a user to use the remote computer system from a different physical location via the client computer system. The screen content of the remote computer system, such as user interface of an operating system or application, can be displayed on the client computer system by sending a representation of the screen content from the remote computer system to the client computer system via the computer network. The screen content, which changes over time, can be represented as a sequence of digital images that are generated or captured on the remote system, sent to the client computer system via the network or other form of communication, and displayed on the client computer system. The digital images can be displayed in rapid succession so that changes to the screen content on the remote computer system are reflected in the images displayed on the client computer system in near real time. "Digital image" herein shall refer to a set of values, referred to as picture elements or pixels that can be arranged in rows and columns. Each pixel can represent the specified color having a specified brightness at a corresponding point in the digital image. The remote desktop system can capture each frame of the user interface on the remote system as a digital image and send the digital image to the client computer system, e.g., via a computer network. The client computer system can receive and display the digital image on a display device such as a monitor screen, thereby displaying the user interface that was generated on the remote system. A digital image can be in a data format such as RGB, in which each pixel can include red, green, and blue color values, or YUV, in which each pixel can include a Y' component that represents a luminance (e.g., brightness), and U and V components that represent chrominance (e.g., color), where U represents a blue projection and V represents a red projection.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2E depicts a block diagram of example selections of two regions of basis functions that contribute to a vertical sum of coefficients, in accordance with one or more aspects of the present disclosure;

FIG. 4 depicts a flow diagram of an example method to classify blocks of an input image as being text-oriented or graphics-oriented, in accordance with one or more aspects of the present disclosure;

DETAILED DESCRIPTION

Figure 1:
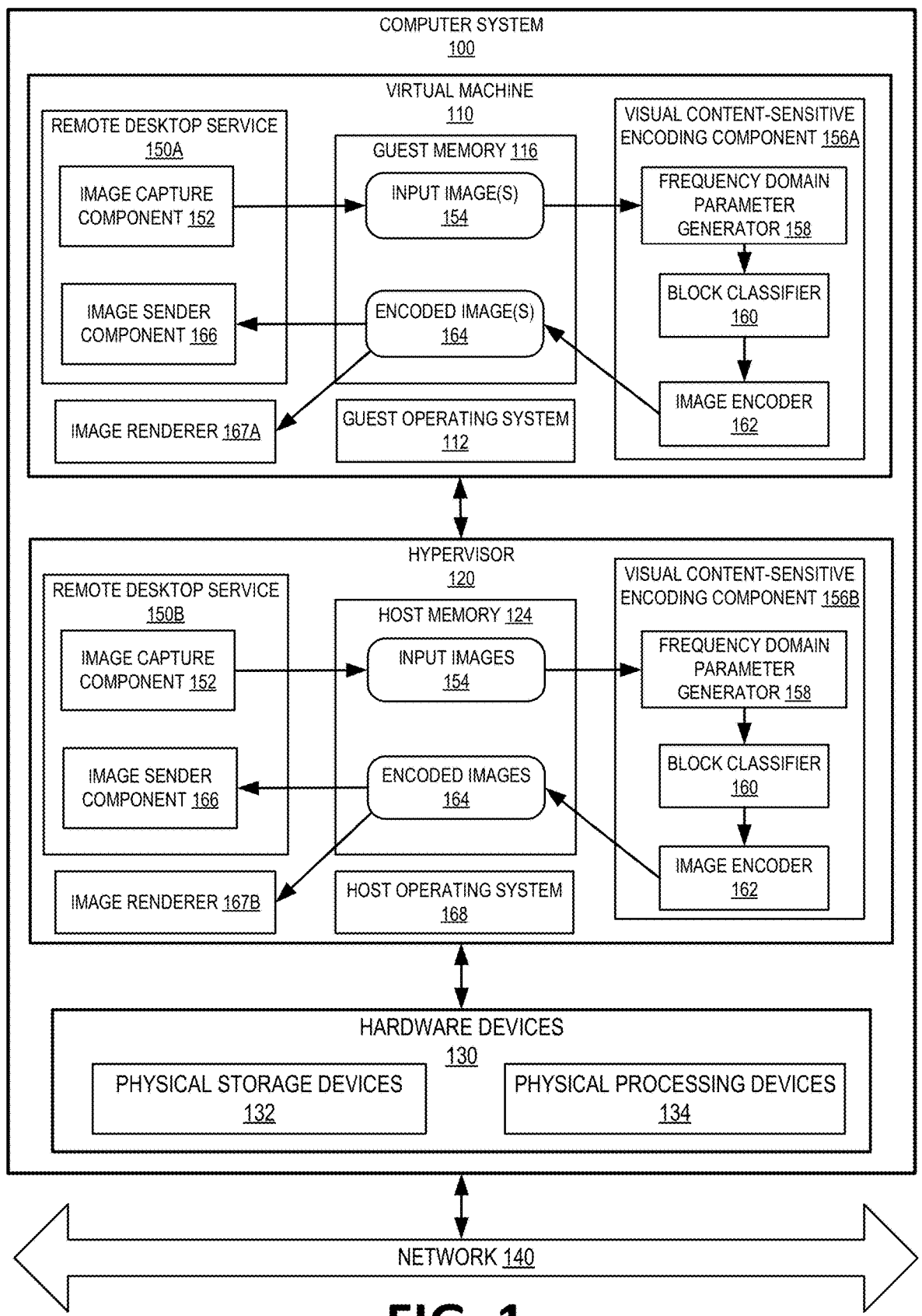
FIG. 1 depicts a high-level block diagram of an example computing system that enables a visual content-sensitive encoding component to classify images as text-oriented or graphics-oriented, and encode the images according to the classification, in accordance with one or more aspects of the present disclosure.

Described herein are systems and methods for content-based image encoding, e.g., in remote desktop applications. The screen content of a server, such as user interface of an operating system or application, can be displayed on a client by sending a representation of the screen content from the remote computer system to the client computer system via a communication network. The screen content can be represented as a sequence of digital images that are generated or captured on the remote system. Digital images can be relatively large in size, and sending digital images via the computer network can use a substantial amount of the communication network's bandwidth. Further, as the resolution of display devices increases, the sizes of digital images also increase. For example, an image of a 1080p screen has 1920×1080 pixels, and uses 24 bits per pixel. Thus, the size of a single image of a 1080p screen can be represented by 1.21 megabytes in a lossless data format. A remote desktop system can send multiple such images per second via the communication network. Such network usage can exceed the available bandwidth of the network, or limit the amount of bandwidth available for other uses. Further, there can be a substantial delay between images if the network bandwidth is insufficient to send the images at the rate they are generated by the remote system. Thus, large image sizes can slow the performance and responsiveness of the remote desktop system.

Some remote desktop systems compress screen images to reduce bandwidth usage. For example, each image can be encoded in a compressed data format, such as JPEG, using an image encoder. Compressed data formats often reduce the sharpness of the image, e.g., by averaging the values of adjacent pixels. Image compression techniques that reduce sharpness can reduce the size of images by a substantial amount, but also reduce image sharpness. Reduction in image sharpness of is less noticeable by human visual perception for graphics than for text, since text has fine details that can be difficult or impossible to discern if blurred. The screen images sent by remote desktop systems often contain text characters, such as symbols of a written language, which are displayed by numerous applications, such as word processors, email clients, web browsers, and so on. The text from the remote computer system can be blurred (or otherwise distorted) as a result of image compression. Thus, the text in the compressed images can be unreadable or difficult to read when displayed on the client computer system. Some image encoders have parameters that can be specified to increase the sharpness of fine details in the encoded image, but increasing the sharpness using such parameters reduces the amount of compression achieved on the entire encoded image. Thus, although it is possible to increase the sharpness of the encoded image, doing so reduces the effectiveness of the compression on the entire image. Non-text portions of the image, which can include graphics, such as video or photo sub-images, window borders, icons, and the like, are not compressed as effectively as they would be with lower sharpness setting.

Aspects of the present disclosure address the above and other deficiencies by providing technology that classifies portions of an input image as depicting text or depicting graphics, and generates a compressed image by encoding each portion using encoding parameters suitable for the portion's respective classification. The input image can be an image of a remote desktop screen on a remote computer system, for example, and the compressed image can be sent via a communication network to a client computer system, which can render the compressed image via an image rendering device. Each portion of the input image can be a block of pixels of a predetermined size, e.g., 8×8 pixels.

Each input block can be classified as depicting text or depicting graphics by generating a visual content classification value for the input block. If the visual content classification value satisfies a threshold condition, then the input block can be encoded using a text-oriented encoding, in order to produce a block having a sharpness sufficient to discern the text, for example. If the visual content classification value does not satisfy the threshold condition, then the input block is encoded using a graphics-oriented encoding. The graphics-oriented encoding can cause the encoder to generate an encoded block having lower sharpness but higher compression than the text-oriented encoding, for example.

The visual content classification value for each particular block of the input can be derived from one or more frequency domain parameters that are calculated for the particular block. Each of the frequency domain parameters can be a characterization of an amount of fine detail (e.g., variation) present in the particular block. The frequency domain parameters can reflect a horizontal frequency domain parameter that corresponds to an amount of variation along a horizontal axis and a vertical frequency domain parameter that corresponds to an amount of variation along a vertical axis of the particular block.

The frequency domain parameters can be calculated using a transformation of the particular block's pixel values (such that each pixel value encodes the color of a corresponding pixel, e.g., a luma value of the pixel) from the spatial domain to the frequency domain. The transformation can be a discrete cosine transformation (DCT) that generates a transformation matrix of DCT coefficients, for example. Each DCT coefficient can specify an amount of energy (or amplitude) of a particular frequency associated with the position (e.g., row and column) of the coefficient in the transformation matrix.

A DCT coefficient of zero indicates that the frequency associated with the coefficient's position in the transformation matrix does not contribute to the image. A nonzero DCT coefficient indicates the amount by which the frequency associated with the coefficient contributes to the image. Higher frequencies correspond to finer levels of detail in the image, and the frequencies associated with the coefficients increase as the row and column numbers increase. Thus, the coefficient at the upper left corner of the matrix corresponds to a broad level of detail (e.g., no color variation in the image), and the coefficient at the lower right corner of the matrix corresponds to a fine level of detail (e.g., a high amount of color variation).

The frequency domain parameters can include a horizontal frequency domain parameter that corresponds to an amount of variation along a horizontal axis and a vertical frequency domain parameter that corresponds to an amount of variation along a vertical axis of the particular block. The particular block's horizontal frequency domain parameter can be calculated as an absolute sum of certain horizontal coefficients of the particular block divided by a predetermined value. The certain horizontal coefficients can be values from one or more particular rows of the transformation matrix. Similarly, the particular block's vertical frequency domain parameter can be calculated as an absolute sum of certain vertical coefficients of the particular block divided by the predetermined value. The certain vertical coefficients can be values at the same positions in the one or more particular rows of the transformation matrix subsequent to transposing the matrix (e.g., swapping the rows and columns).

The visual content classification value for the particular block can be generated based on a mean horizontal frequency domain parameter and a mean vertical frequency domain parameter calculated for the particular block. The mean horizontal frequency domain parameter for a particular block can be calculated as a mean value of the particular block's horizontal frequency domain parameter and at least one other block's horizontal frequency domain parameter, where the other block is adjacent to the particular block along the image's x-axis ("horizontally adjacent"). For example, the mean horizontal frequency domain parameter can be the mean of the particular block's horizontal frequency domain parameter and the horizontal frequency domain parameters of a block to the left of the particular block (e.g., in the same row, in the previous column) and of a block to the right of the particular block (e.g., in the same row, in the next column).

The mean vertical frequency domain parameter for a particular block can be calculated as a mean value of the particular block's vertical frequency domain parameter and at least one other block's vertical frequency domain parameter, where the other block is adjacent to the particular block along the image's y-axis ("vertically adjacent"). For example, the mean vertical frequency domain parameter can be calculated as the mean of the particular block's vertical frequency domain parameter and the vertical frequency domain parameters of a block above the particular block (e.g., in the same column, in the previous row) and of a block below the particular block (e.g., in the same column, in the next row).

The mean horizontal and vertical frequency domain parameters can be combined to form the visual content classification value that is used to determine which type of encoding to use for the block. For example, the visual content classification value can be calculated as a sum of the mean horizontal and vertical frequency domain parameters.

As described above, if the visual content classification value satisfies a threshold condition, then the input block is encoded using a text-oriented encoding, which can generate an encoded block having a sharpness sufficient for a human to discern the text. If the visual content classification value does not satisfy the threshold condition, then the input block is encoded using a graphics-oriented encoding, which can produce a smaller encoded image than the text-oriented encoding, for example. The threshold condition can be satisfied if, for example, the visual content classification value is greater than a predetermined threshold value.

The systems and methods described herein include technical improvements to image encoding technology. In particular, aspects of the present disclosure may use a visual content-sensitive encoding technique to encode a digital image that depicts text and graphics to form a compressed image in which each region classified as depicting graphics is compressed using a graphics-oriented encoding and each region classified as depicting text is encoded using a text-oriented encoding. The visual content-sensitive encoding technique achieves the benefits of graphics-oriented encoding, e.g., higher compression ratios, for graphics regions, without the drawbacks of graphics-oriented encoding, such as blurred text in text regions. Since regions classified as depicting text are encoded using the text-oriented encoding, the text does not appear blurry in the encoded images.

These improvements to encoding technology enable improvements to remote desktop technology, since images of remote desktop screens can be reduced in size using graphics-oriented encodings on image regions depicting graphics regions while retaining sharpness of regions depicting text. Thus, images of remote desktops, which often depict text and graphics, can be encoded to images having smaller sizes than would be achieved if a text-oriented encoding were used for entire images, and having sharper text than would be achieved if a graphics-oriented encoding were used for entire images. Reducing the size of images can increase the performance of computing systems and reduce the amount of network bandwidth and storage space used by images. For example, reducing the size of images can increase the performance of a remote desktop system, since less network bandwidth is used to transmit images of screens.

Various aspects of the above referenced methods and systems are described in details herein below by way of examples, rather than by way of limitation. The examples provided below discuss a visual content-sensitive encoding system that is used by a remote desktop system. In other examples, the visual content-sensitive encoding system can be used in other applications absent the remote desktop system described below.

FIG. 1 depicts a high-level block diagram of an example computing system 100 that enables a visual content-sensitive encoding component 156 to classify images 154 as text-oriented or graphics-oriented, and encode the images 154 according to the classification, in accordance with one or more aspects of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machine 110, hypervisor 120, hardware devices 130, and a network 140.

Virtual machine 110 may execute guest executable code that uses an underlying emulation of the physical resources. The guest executable code may include a guest operating system, guest applications, guest device drivers, etc. Virtual machines 110 may support hardware emulation, full virtualization, para-virtualization, operating system-level virtualization, or a combination thereof. Virtual machine 110 may have the same or different types of guest operating systems, such as Microsoft®, Windows®, Linux®, Solaris®, etc. Virtual machine 110 may execute guest operating system 112 that manages guest memory 116.

Guest memory 116 may be any virtual memory, logical memory, physical memory, other portion of memory, or a combination thereof for storing, organizing, or accessing data. Guest memory 116 may represent the portion of memory that is designated by hypervisor 120 for use by virtual machine 110.

Host memory 124 (e.g., hypervisor memory) may be the same or similar to the guest memory but may be managed by hypervisor 120 instead of a guest operating system. The memory allocated to guests may be a portion of host memory 124 that has been allocated by hypervisor 120 to virtual machine 110 and corresponds to guest memory 116. Other portions of hypervisor memory may be allocated for use by hypervisor 120, a host operating system 168, hardware device, other module, or a combination thereof.

Hypervisor 120 may also be known as a virtual machine monitor (VMM) and may provide virtual machine 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system 168. Hypervisor 120 may manage system resources, including access to hardware devices 130. In the example shown, hypervisor 120 may include an execution component 122.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

A remote desktop service 150 can execute on virtual machine 110 and/or hypervisor 120. Components of the remote desktop service 150 that execute on virtual machine 110 are shown as a remote desktop service 150A in the virtual machine 110. Components of the remote desktop service 150 that execute on the hypervisor 120 are shown as remote desktop service 150B. Although components of the remote desktop service 150 are shown on both the virtual machine 110 and the hypervisor 120, in some implementations the remote desktop service 150 can be located on either the virtual machine 110 or the hypervisor 120. Thus, remote desktop service 150 can refer to either or both of remote desktop service 150A or remote desktop service 150B.

Further, a visual content-sensitive encoding component 156 can execute on virtual machine 110 and/or hypervisor 120. Components of the visual content-sensitive encoding component 156 that execute on virtual machine 110 are shown as visual content-sensitive encoding component 156A in the virtual machine 110. Components of the visual content-sensitive encoding component 156 that execute on the hypervisor 120 are shown as visual content-sensitive encoding component 156B in the hypervisor 120. Although components of the visual content-sensitive encoding component 156 are shown on both the virtual machine 110 and the hypervisor 120, in some implementations the visual content-sensitive encoding component 156 can be located on either the virtual machine 110 or the hypervisor 120. Thus, visual content-sensitive encoding component 156 can refer to either or both of visual content-sensitive encoding component 156A or visual content-sensitive encoding component 156B.

The remote desktop service 150 includes an image capture component 152 that can capture screen images generated on computer system 100 and store the captured screen images in guest memory 116 as input images 154. A visual content-sensitive encoding component 156 can encode the images in a suitable format, e.g., JPEG or the like, and store the encoded images 164 in guest memory 116. As described below, an image sender component 166 of the remote desktop service 150 can cause the encoded images 164 to be sent to another computer system (not shown) via network 140. The encoded images 164 can be received and displayed by a remote desktop client component on the other computer system, so that a user of the other computer system can interact with the computer system 100. Alternatively or in addition to sending the encoded images 164, an image renderer 167 can cause the image to be rendered by an image rendering device, such as a graphics processing unit, display adapter, and/or a display device of the computer system 100 or of another computer system (not shown). The image renderer 167 can include an image renderer 167A that executes on the virtual machine 110 and/or an image renderer 167B that executes on the hypervisor 120.

The input images 154 can represent a user's desktop environment, for example. The input images 154 can be generated by a processor of the computer system 100, such as a central processing unit or graphics processing unit. The input images 154 can be captured at a suitable frame rate, e.g., 30 or 60 frames per second, where each frame corresponds to a captured screen image. The input images 154 can be, but are not necessarily, displayed on a display device of the computer system 100.

For example, if the image capture component 152 is executing on the virtual machine 110, the image capture component 152 can capture the input images 154 in guest memory 116 and instruct guest operating system 112 to not display the input image 154. As another example, if the image capture component 152 is executing on the hypervisor 120, the image capture component 152 can capture the input images 154 in host memory 124 and instruct host operating system 168 and/or guest operating system 112 to not display the input images 154.

The visual content-sensitive encoding component 156 includes a frequency domain parameter generator 158, a block classifier 160, and an image encoder 162. The frequency domain parameter generator 158 can identify blocks of each input image 154 and generate a frequency domain parameter for each block. The frequency domain parameter can be interpreted as a level of detail of the block, for example. The block classifier 160 can generate a visual content classification value for each block, and determine whether the visual content classification value satisfies a visual content-specific threshold. If the visual content-specific threshold is satisfied, the image encoder 162 can encode the input image 154 using a text-oriented encoding. The text-oriented encoding may be, e.g., an encoding that generates an encoded image 164 having sharpness sufficient to represent text symbols legibly, e.g., so that the text symbols can be discerned from the encoded image 164. Further details relating to the operations of the visual content-sensitive encoding component 156 are described below.

Figure 2A:
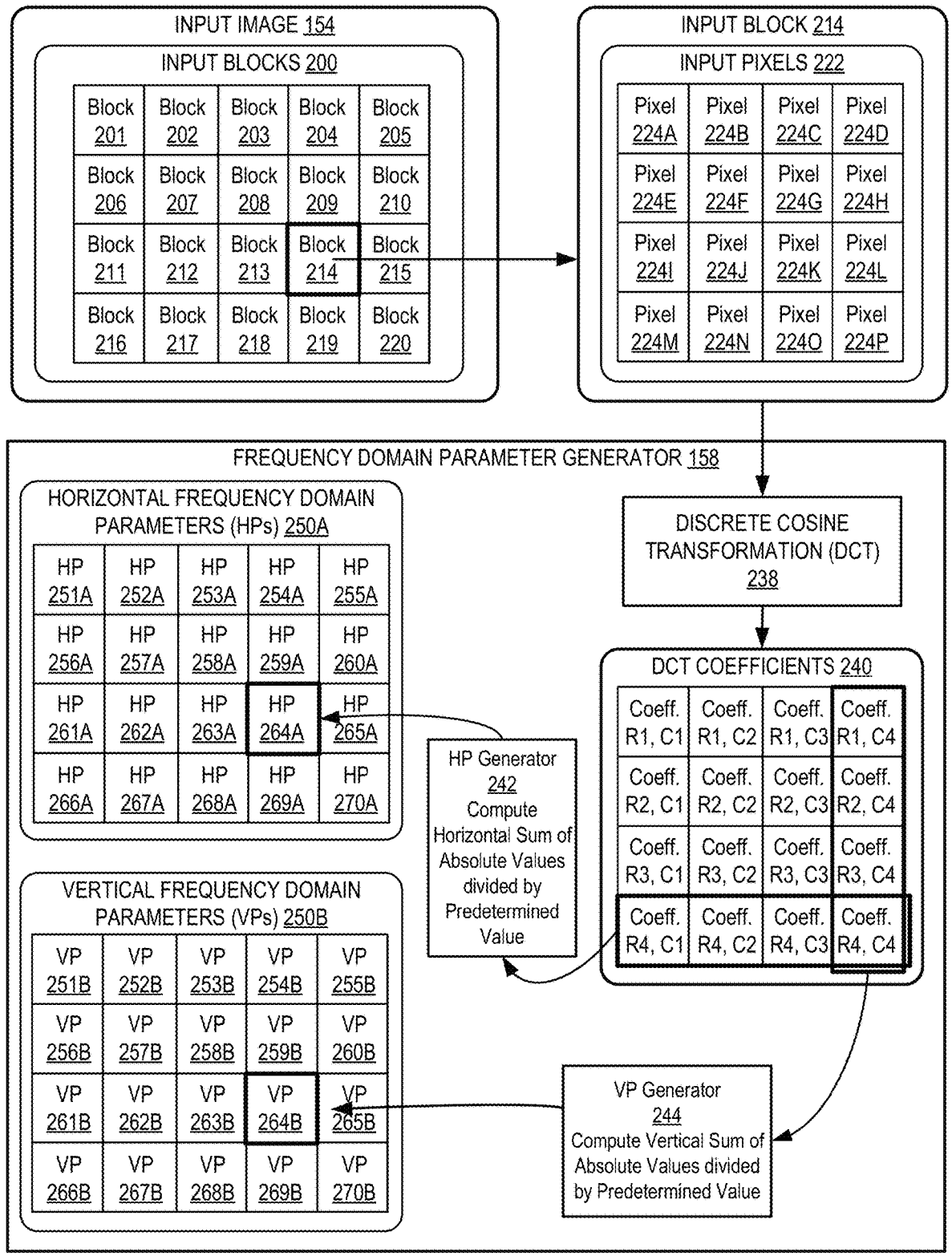
FIG. 2A depicts a block diagram of an example frequency domain parameter generator that generates frequency domain parameters for blocks of an input image, in accordance with one or more aspects of the present disclosure.

FIG. 2A depicts a block diagram of an example frequency domain parameter generator 158 that generates frequency domain parameters for blocks 200 of an input image 154, in accordance with one or more aspects of the present disclosure. The frequency domain parameter generated for each block can represent an amount of fine detail, e.g., color variation, present in the block. The frequency domain parameter for each block is stored in a matrix (e.g., a two-dimensional array) of frequency domain parameters. Each frequency domain parameter in the matrix corresponds to one of the input blocks 200 of the input image 154.

The level of detail of an input block 214 can be measured in the horizontal (e.g., x-axis) and vertical (e.g., y-axis) directions of an input block 214. Thus, a horizontal frequency domain parameter can represent a level of horizontal detail of the block, and a vertical frequency domain parameter can represent a level of vertical detail of the block. For example, if each pixel in a vertical column of four pixels of a 4×4 block has the same color value, then there is no variation in the vertical direction for that column, and the level of vertical detail in the block is low. However, if each pixel in a vertical column of four pixels of a 4×4 block has a different color value, and there is high contrast between the color values (especially between adjacent pixels), then there is high variation in the vertical direction for that column, and the level of fine vertical detail in the block is high. The level of fine horizontal detail in a block can be similarly characterized using a row of pixels of the block.

For each input block 214, the frequency domain parameter generator 158 can generate a horizontal frequency domain parameter ("HP") representing the level of fine horizontal detail in the block, and store the HP in a matrix of horizontal frequency domain parameters 250A. The matrix of horizontal parameters 250 includes 20 example horizontal parameter values, labeled HP 251A through HP 270A. Similarly, for each input block 214, the frequency domain parameter generator 158 can generate a vertical frequency domain parameter ("VP") representing the level of fine vertical detail in the block, and store the VP in a matrix of vertical frequency domain parameters 250B. The matrix of vertical parameters 250 includes 20 example vertical parameter values, labeled VP 251B through VP 270B.

The block classifier 160 can use the tables of horizontal frequency domain parameters 250A and vertical frequency domain parameters 250B to generate a visual content classification value for each block. The block classifier 160 can generate the visual content classification value for each block using the frequency domain parameter for the block and/or the frequency domain parameters of other blocks, such as adjacent blocks, as described below.

The frequency domain parameter generator 158 can receive an input image 154, e.g., from the remote desktop service 150 or other source, such as a file, network, or application. The frequency domain parameter generator 158 can identify as plurality of input blocks 200 in each input image 154, e.g., by accessing the input image 154 in square or rectangular regions of particular dimensions, such as 4×4 or 8×8 pixels, or other suitable dimensions. Thus, each of the input blocks 200 can correspond to a respective portion of the input image 154. In the example of FIG. 2A, the input image 154 is divided into four rows of five blocks each, which is a total of 20 blocks. Thus, the input blocks 200 are labeled with reference numbers 201-220. Each of the input blocks 200 corresponds to a region of 4×4 pixels of the input image 154. A particular block 214 is shown as further detail as input block 214, which has 16 input pixels 222 referred to as pixel 224A through pixel 224P.

The frequency domain parameter generator 158 performs a discrete cosine transformation (DCT) 238 on the input block 214. The DCT 238 is not necessarily performed on all of the input blocks 200, since particular input blocks that meet criteria for exclusion can be excluded from the determination of whether to encode the block using a text-oriented encoding or a graphics-oriented encoding. For example, if a particular block has not changed since a previous image was encoded, then the encoding generated from the previous image can be used. Thus, the input blocks 214 provided to the DCT 238 can be changed blocks that are different from a corresponding block of a previous image. Unchanged blocks can be excluded because, for example, a previously-calculated visual content classification value can be used, or as in the case of the remote desktop service, unchanged blocks need not be sent via the network, since the remote desktop client can use a previously-sent block. As another example, if each pixel 222 in an input block 214 is the same color, the input block 214 can be excluded from the determination of whether to encode. A block 214 of pixels of the same color does not have any text, and can be classified as a graphics-oriented block. Thus, the DCT 238 can be performed on the input block 214 if at least two input pixels 222 have values specifying different colors.

Figure 2B:
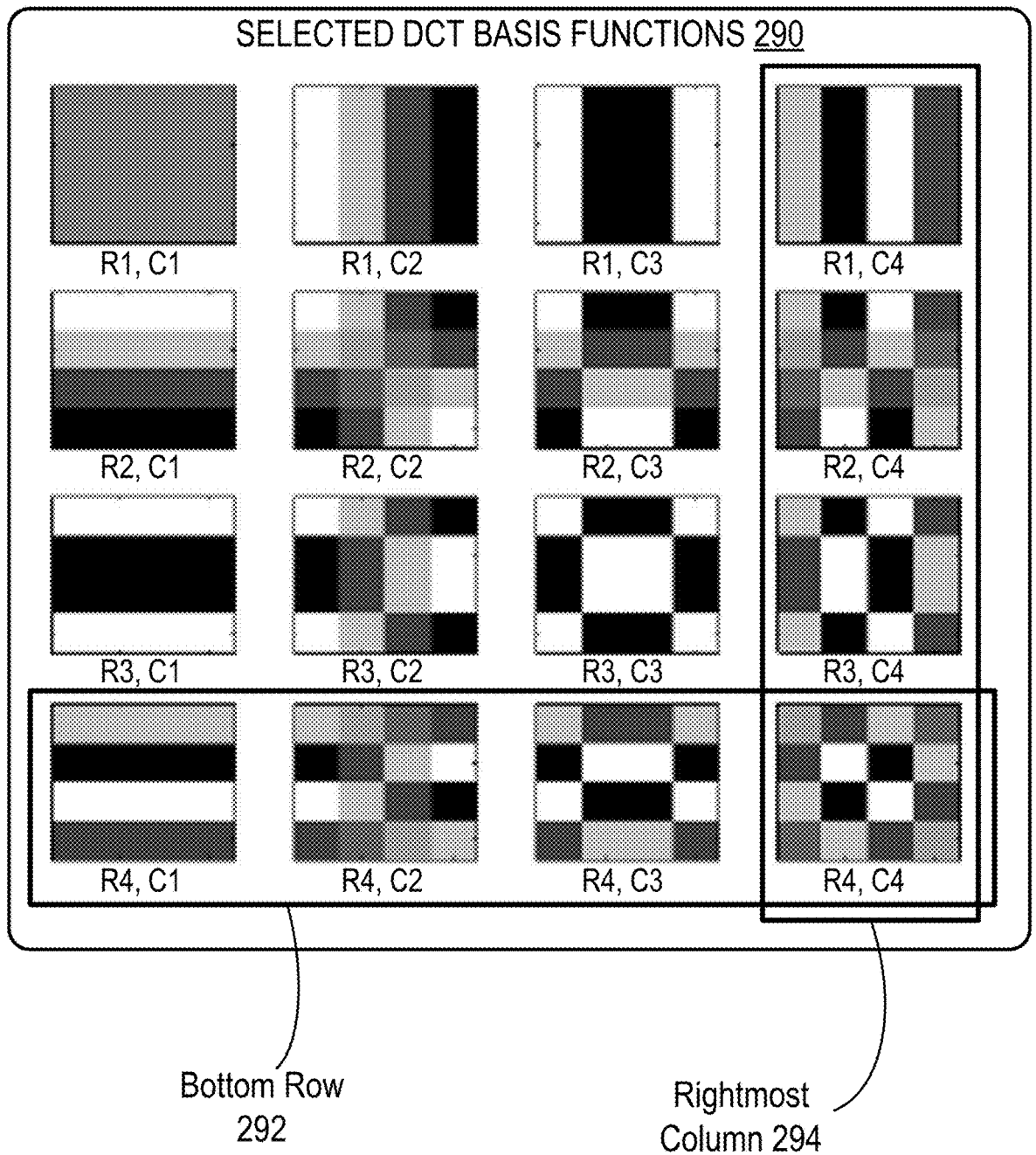
FIG. 2B depicts a block diagram of example selections of a row and column of basis functions corresponding to fine levels of detail, in accordance with one or more aspects of the present disclosure.

The DCT 238 generates a frequency-based representation of the input block 214. The frequency-based representation of the input block 214 can be a sum of sinusoids of varying amplitudes and frequencies, and can be specified as a matrix of DCT coefficients 240 ("transformation matrix"). Each DCT coefficient in the DCT matrix corresponds to a particular frequency, and the value of each DCT coefficient represents an amplitude (e.g., a weight) by which the particular frequency can be multiplied to form the frequency-based representation of the input block 214. Each particular frequency can correspond to a basis function of a set of basis functions, and each DCT coefficient can represent a weight applied to the respective basis function. The set of basis functions for a block of 4×4 pixels is shown in FIG. 2B. A representation of the original input image can be generated using an "inverse DCT" operation that computes a linear combination of the coefficients and their respective frequencies (e.g., a sum of products of the coefficients and their respective frequencies).

The matrix of DCT coefficients 240 can have the same dimensions as the input block 214. In this example, since the dimensions of the input block 214 are 4×4 pixels, the dimensions of the matrix of DCT coefficients 240 are 4×4 coefficients. Thus, the matrix of DCT coefficients 240 has four rows and four columns. Each of the DCT coefficients 240 is labeled with a row number and a column number in FIG. 2A for explanatory purposes. For example, the coefficient at the top right of the matrix is labeled R1, C1 to indicate that the coefficient is located at the intersection of row 1 and column 1. As another example, the coefficient at the top right of the matrix is labeled R1, C4 to indicate that the coefficient is at row 1, column 4 of the matrix.

A DCT coefficient value of zero indicates that the frequency associated with the coefficient's position in the transformation matrix does not contribute to the image. A nonzero DCT coefficient indicates the amount (e.g., amplitude) by which the frequency associated with the coefficient contributes to the image. As can be seen in FIG. 2B, higher frequencies correspond to finer levels of detail in the image, and the frequencies associated with the coefficients increase as the row and column numbers increase. The position (e.g., row and column numbers) of each coefficient in the DCT coefficient matrix 240 corresponds to the position (row and column numbers) of a respective basis function in the basis function matrix 290 shown in FIGS. 2B and 2C. Thus, the coefficient at the upper left corner of the DCT coefficient matrix 240 corresponds to a broad level of detail (e.g., no color variation in the image), and the coefficient at the lower right corner of the matrix corresponds to a fine level of detail (e.g., a high amount of color variation). As such, the bottom row of the DCT coefficient matrix 240 contains the highest vertical frequency, and thus the finest level of vertical detail. Further, the rightmost column of the DCT coefficient matrix 240 contains the highest horizontal frequency, and thus the finest level of horizontal detail.

Referring to FIG. 2A, the frequency domain parameter generator 158 can generate a frequency domain parameter value for the input block 214 by computing a sum of two or more coefficients in a sub-matrix or sub-vector selected from the matrix of DCT coefficients 240, and dividing the sum by a predetermined value. The frequency domain parameter values can include horizontal frequency domain parameters 250A and vertical frequency domain parameters 250B. Since the frequency domain parameters 250 are calculated in both the horizontal and vertical directions of the matrix 240, the sub-matrix or sub-vector can be at least a portion of a row or column of the matrix 240. The sum can be a sum of the two or more coefficients, or a sum of absolute values of the two or more coefficients.

A horizontal frequency domain parameter (HP) generator 242 can compute a HP as a horizontal sum of absolute values of certain horizontal coefficients of the transformation matrix 240 divided by a predetermined value. In this example, the certain horizontal coefficients include the bottom row of the matrix of DCT coefficients 240. Thus, the horizontal sum is the sum of coefficients in columns 1-4 of row 4. The bottom row of the coefficient matrix 240 corresponds to the bottom row 292 of the basis function matrix 290 shown in FIG. 2B. Since each basis function in the bottom row has the highest vertical frequency (and thus finest detail in the vertical direction) of the basis functions in the matrix 290, and the coefficient values in the bottom row indicate the weights of the basis functions in the bottom row, the sum of the bottom row of the coefficient matrix provides a characterization of the amount of vertical detail in the input block 214. The sum of the bottom row also provides a characterization of the amount of horizontal detail in the input block across four different levels of horizontal detail represented by the four columns of the basis function matrix 290. The HP generator 242 thus calculates the horizontal sum as the sum of absolute values of the coefficients in columns 1-4 of row 4 in this example. In other examples, other horizontal vectors (or sub-matrices) can be used as the certain horizontal coefficients. For example, the certain horizontal coefficients can include the right half of the bottom vector of the matrix of DCT coefficients 240, which corresponds to the right half of the bottom row 296 of the basis function matrix 290 shown in FIG. 2C.

As indicated above, the HP generator 242 can divide the horizontal sum by a predetermined value. The predetermined value can be a scale factor multiplied by the number of coefficients in the vector of DCT coefficients that were added together to calculate the sum of coefficients. In this example, the number of coefficients is 4 (or 2, if the right half of the row is used). The scale factor can be, for example, 8, 10, 18, 20, 22, or 25. The scale factor can be determined empirically, e.g., by performing the operations of the visual content-sensitive encoding component 156 on a set of input images and identifying values of the scale factor that produce desired results, such as encoded images 164 that are less than a desired size and depict text with at least a threshold sharpness. In this example, the scale factor is 18, and the HP generator 242 calculates the HP for the input block 214 by dividing the horizontal sum by 18*4.

The HP generator 242 can then store the calculated HP in the matrix of HPs 250A at a position (e.g., row and column numbers) that corresponds to the input block for which the HP is calculated. For example, since the example input block 214 is at row 3, column 3 of the input image 154, the HP 264A is stored at row 3, column 3 in the matrix of HPs 250A. In this way, a HP can be calculated for each of the input blocks 200 and stored at a respective location in the matrix of horizontal frequency domain parameters 250A.

A vertical frequency domain parameter (VP) generator 244 can compute a VP as a vertical sum of absolute values of a certain vertical vector of the DCT coefficients 240 divided by a predetermined value. In this example, the certain vertical vector is the rightmost column of the matrix of DCT coefficients 240. Thus, the vertical sum is the sum of coefficients in rows 1-4 of column 4. The rightmost column of the coefficient matrix 240 corresponds to the rightmost column 294 of the basis function matrix 290 shown in FIG. 2B. Since each basis function in the rightmost column has the highest horizontal frequency (and thus finest detail in the horizontal direction) of the basis functions in the matrix 290, and the coefficient values in the rightmost column indicate the weights of the basis functions in the rightmost column, the sum of the rightmost column of the coefficient matrix provides a characterization of the amount of horizontal detail in the input block 214. The sum of the rightmost column also provides a characterization of the amount of horizontal detail in the input block across four different levels of horizontal detail represented by the four rows of the basis function matrix 290. The VP generator 244 thus calculates the vertical sum as the sum of absolute values of the coefficients in rows 1-4 of column 4 in this example. In other examples, other vertical vectors can be used as the certain vertical vector. For example, the certain vertical vector can be the bottom half of the rightmost column of the matrix of DCT coefficients 240, which corresponds to the bottom half of the rightmost column 298 of the basis function matrix 290 shown in FIG. 2C.

As indicated above, the VP generator 244 can divide the vertical sum by a predetermined value. The predetermined value can be a scale factor multiplied by the number of coefficients in the vector of DCT coefficients that were added together to calculate the sum of coefficients. In this example, the number of coefficients is 4 (or 2, if the bottom half of the column is used). The scale factor can be, for example, the same scale factor used by the horizontal frequency domain parameters 250A as described above. In this example, the scale factor is 18, and the VP generator 244 divides the vertical sum by 18*4, which is the value of the VP for the input block 214.

The VP generator 244 can then store the calculated VP in the matrix of VPs 250B at a position (e.g., row and column numbers) that corresponds to the input block for which the VP is calculated. For example, since input block 214 is at row 3, column 3 of the input image 154, the VP 264B calculated for input block 214 is stored at row 3, column 3 in the matrix of VPs 250B. In this way, a VP can be calculated for each of the input blocks 200 and stored at a respective location in the matrix of vertical frequency domain parameters 250B.

Although images and blocks of particular dimensions are described in the examples herein, images and blocks of other dimensions can be used. For example, the input image 154 can have the dimensions of a screen image, which can correspond to a screen resolution, and can be 1920×1080 or other resolution. As another example, each input block can be 8×8 pixels, or other suitable dimension. Further, although as particular transformation (the DCT) is described in the examples herein, other transformations, e.g., a Discrete Fourier Transformation, can be used in other examples.

FIG. 2B depicts a block diagram of example selections of high-frequency basis functions corresponding to fine levels of detail, in accordance with one or more aspects of the present disclosure. FIG. 2B shows an example DCT basis function matrix 290 for a 4×4 block of pixels and two selected vectors 292, 294. Each element of the basis function matrix corresponds to a frequency, which is represented as a 4×4 pixel image in FIG. 2B. An input block 214 can be represented as a weighted sum of the basis functions, where the weight of each basis function is specified by the coefficient at the corresponding location in the DCT coefficient matrix 240. For example, a block having coarse detail (e.g., a single color) can be represented using the top-left basis function (at row 1, column 1), in which case the top-left coefficient of the matrix 240 can have a non-zero value, and each of the other coefficients can have a zero value. Other combinations of the basis functions using particular weights can be represented by a coefficient matrix 240 having the particular weights. As can be seen in FIG. 2B, the vertical frequency, and, accordingly, the level of fine vertical detail, increases toward the bottom of the matrix 290. Further, the horizontal frequency, and, accordingly, the level of fine horizontal detail, increases toward the right side of the matrix 290.

The bottom row vector 292 includes four basis functions located in the bottom row vector (row 4) at columns 1-4. Each basis function in the bottom row vector 292 has the highest vertical frequency (and thus finest detail in the vertical direction) of the basis functions in the matrix 290. Further, each of the four basis functions in the bottom row 292 has a different level of horizontal detail, from lowest (at row 4, column 1) to highest (at row 4, column 4).

Further, the rightmost column vector 294 includes four basis functions located at rows 1-4 of the rightmost column (column 4). Each basis function in the rightmost column 292 has the highest horizontal frequency (and thus finest detail in the horizontal direction) of the basis functions in the matrix 290. Further, each of the four basis functions in the rightmost column vector 294 has a different level of vertical detail, from lowest (at row 1, column 4) to highest (at row 4, column 4).

Figure 2C:
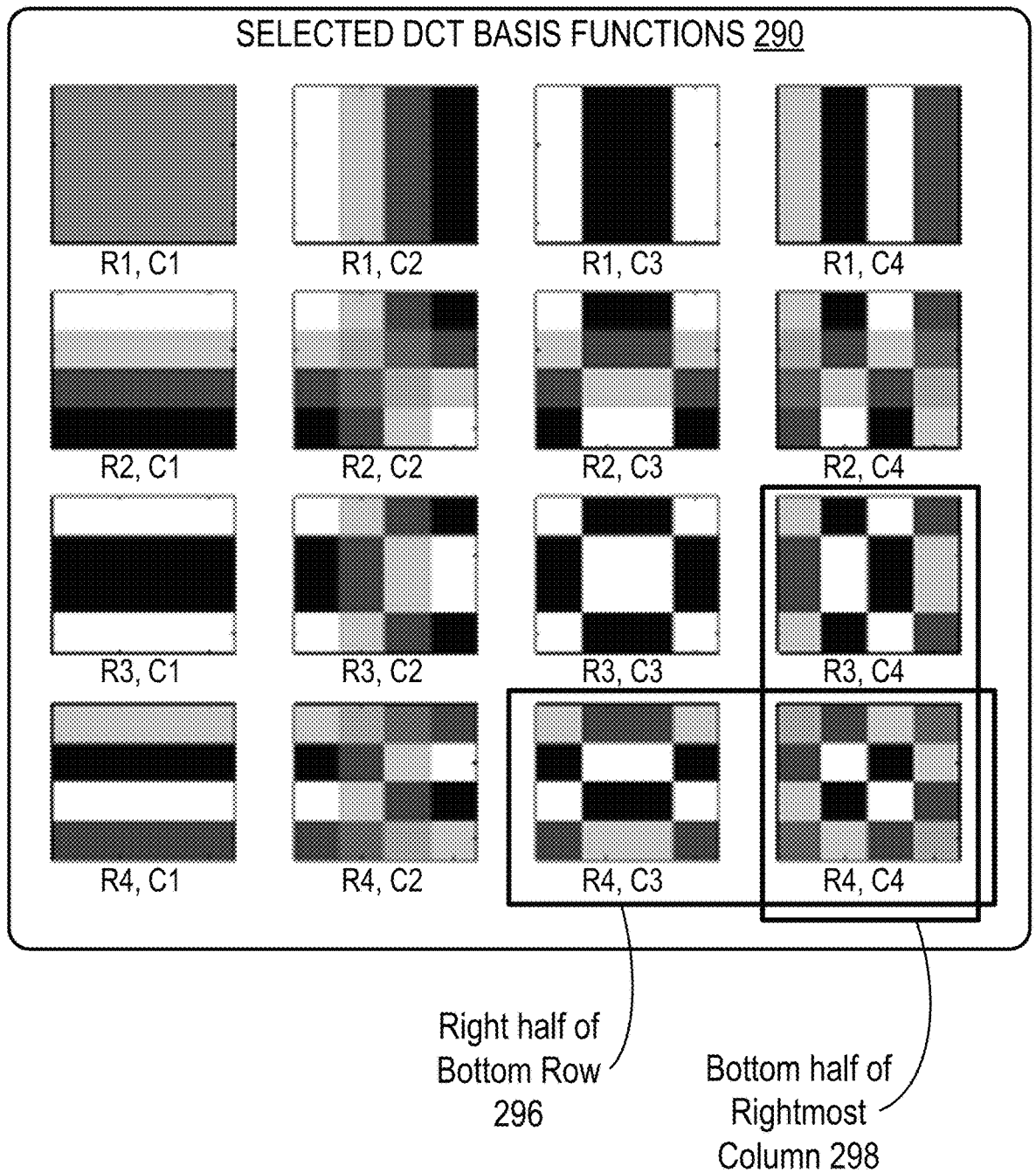
FIG. 2C depicts a block diagram of example selections of a partial row and partial column of basis functions corresponding to fine levels of detail, in accordance with one or more aspects of the present disclosure.

FIG. 2C depicts a block diagram of example selections of a partial row and partial column of basis functions corresponding to fine levels of detail, in accordance with one or more aspects of the present disclosure. FIG. 2C shows the same example DCT basis function matrix 290 as FIG. 2B. However, in FIG. 2C, the two partial vectors 296, 298 are shown as being selected.

A right half of the bottom row vector 296 includes a first basis function at row 4, column 3 and second basis function at row 4, column 4. Thus, each basis function in the right half of the bottom row vector 296 has the highest vertical frequency in the matrix 290. Further, each of the two basis functions in the right half of the bottom row 296 has a different level of horizontal detail, from medium (at row 4, column 3) to highest (at row 4, column 4).

Further, a bottom half of the rightmost column vector 298 includes a first basis function at row 3, column 4 and a second basis function at row 4, column 4. Each basis function in the bottom half of the rightmost column 292 has the highest horizontal frequency (and thus finest detail in the horizontal direction) in the matrix 290. Further, each of the two basis functions in the bottom half of the rightmost column vector 298 has a different level of vertical detail, from medium (at row 3, column 4) to highest (at row 4, column 4).

Figure 2D:
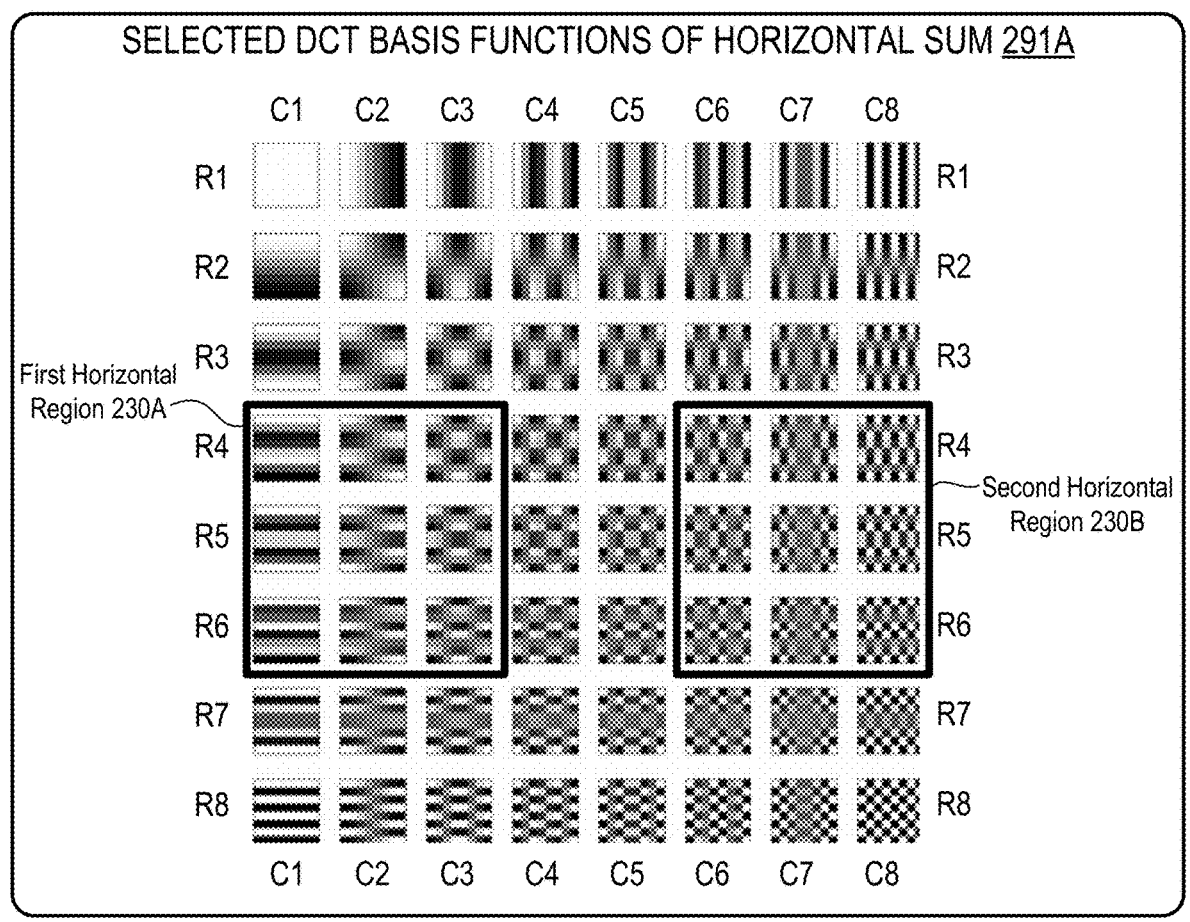
FIG. 2D depicts a block diagram of example selections of two regions of basis functions that contribute to a horizontal sum of coefficients, in accordance with one or more aspects of the present disclosure.

FIG. 2D depicts a block diagram of example selections of two regions of basis functions that contribute to a horizontal sum of coefficients, in accordance with one or more aspects of the present disclosure. FIG. 2D shows an example 8×8 DCT basis function matrix 291A for an 8×8 block of pixels and two selected regions 230A, 230B. Each element of the basis function matrix corresponds to a frequency, which is represented as an 8×8 pixel image in FIG. 2D. An input block 214 can be represented as a weighted sum of the basis functions, where the weight of each basis function is specified by the coefficient at the corresponding location in the DCT coefficient matrix 240. In the example of FIG. 2D, the coefficients used to compute each horizontal frequency domain parameter 250A can be selected from two regions 230, which are referred to herein as "horizontal" regions 230. The horizontal regions include the same rows but different columns, are located at two or more consecutive rows that are at or near the middle of the transformation matrix 240. The horizontal regions can be sub-matrices of the transformation matrix 240. Each horizontal region can be a square matrix of size N×N, where N is less than half the width (or height) of the coefficient matrix 240. In the example of FIG. 2D, N is 3. Each horizontal region includes an edge column of the transformation matrix 240, e.g., column 1 for the first horizontal region 230A and column 8 for the second horizontal region 238B. Further, the horizontal regions are separated by at least one column. In the example of FIG. 2D, the horizontal regions 230A, 230B are separated by two columns. The first horizontal region 230A includes the coefficients at columns 1-3 of rows 4-6. The second horizontal region 230B includes the coefficients at columns 6-8 of rows 4-6. Although the horizontal regions 230 each have three rows and three columns in the example of FIG. 2D, other dimensions can be used. Thus, in another example, the horizontal regions 230 can have two rows and two columns each.

As an example, the sum horizontal parameter generator 242 can compute each horizontal frequency domain parameter 250A of a transformation matrix 240 having 8 rows r1-r8 and 8 columns c1-c8 as a "horizontal sum" of abs(r4c1)+abs(r4c2)+abs(r4c3)+abs(r5c1)+abs(r5c2)+abs(r5c3)+abs(r6c1)+abs(r6c2)+abs(r6c3)+abs(r4c6)+abs(r4c7)+abs(r4c8)+abs(r5c6)+abs(r5c7)+abs(r5c8)+abs(r6c5)+abs(r6c7)+abs(r6c8), where abs is an absolute value function.

Figure 2E:
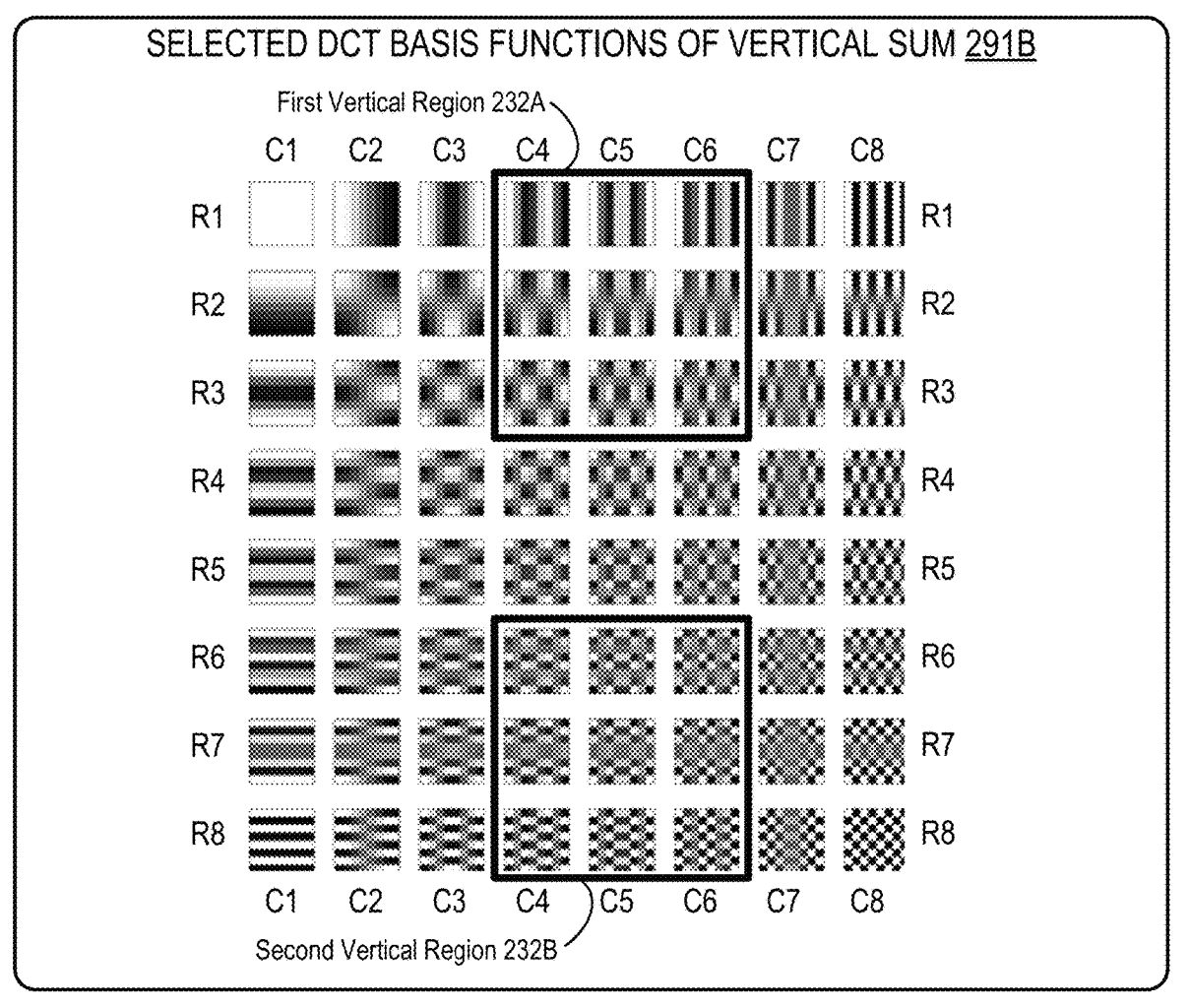

FIG. 2E depicts a block diagram of example selections of two regions of basis functions that contribute to a vertical sum of coefficients, in accordance with one or more aspects of the present disclosure. FIG. 2E shows the example 8×8 DCT basis function matrix 291B for an 8×8 block of pixels and two selected regions 232A, 232B. In the example of FIG. 2E, the coefficients used to compute each vertical frequency domain parameter 250B can be selected from two regions 232 of the transformation matrix 240, which are referred to herein as "vertical" regions 230 because they include the same columns but different rows. The vertical regions 232 correspond to the transpose of the horizontal regions 230 shown in FIG. 2D (where the transpose of the transformation matrix 240 can be determined by swapping the row numbers with the column numbers). Thus, the first vertical region 232A includes the coefficients at rows 1-3 of columns 4-6 of the transformation matrix 240. The second vertical region 232B includes the coefficients at rows 6-8 of columns 4-6.

As an example, the sum vertical parameter generator 244 can compute each vertical frequency domain parameter 250B of an 8×8 transformation coefficient matrix as a sum of the absolute values of the matrix elements that correspond to the transpose of the matrix elements used for the horizontal sum described above with reference to FIG. 2D. That is, each vertical frequency domain parameter 250B can be computed as the "vertical sum" of abs(r1c4)+abs(r1c5)+abs(r1c6)+abs(r2c4)+abs(r2c5)+abs(r2c6)+abs(r3c4)+abs(r3c5)+abs(r2c6)+abs(r6c4)+abs(r6c5)+abs(r6c6)+abs(r7c4)+abs(r7c5)+abs(r7c6)+abs(r8c4)+abs(r8c5)+abs(r8c6).

Figure 3:
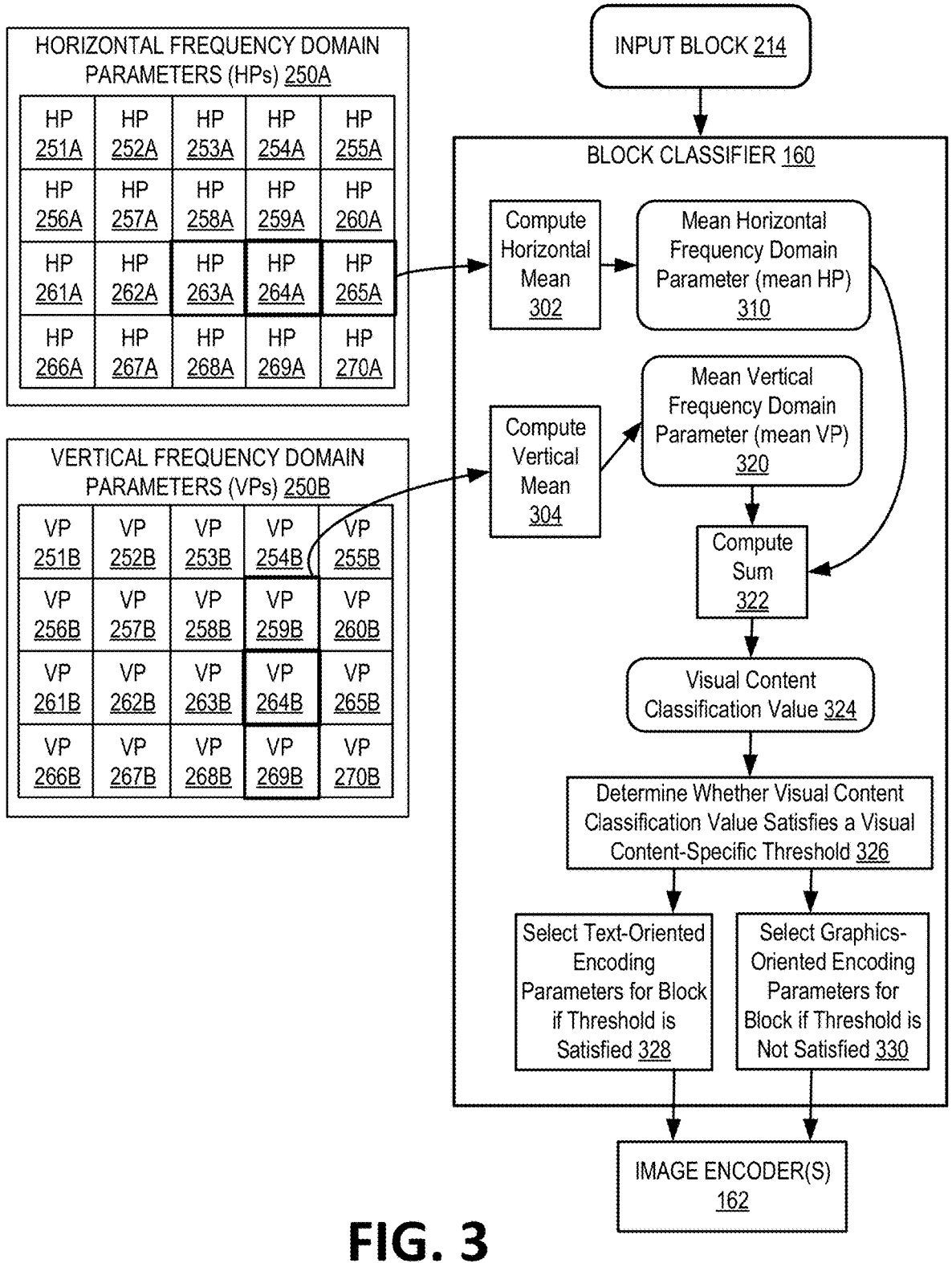
FIG. 3 depicts a block diagram of an example block classifier that classifies blocks of an input image as being text-oriented or graphics-oriented, in accordance with one or more aspects of the present disclosure.

FIG. 3 depicts a block diagram of an example block classifier 160 that classifies blocks 214 of an input image as being text-oriented or graphics-oriented, in accordance with one or more aspects of the present disclosure. The block classifier 160 determines a visual content classification value 324 for a first input block 214 for which a classification is to be determined (particular input blocks 214 can be excluded from classification, as described above with respect to FIG. 2A). The visual content classification value 324 can be a sum of a mean horizontal frequency domain parameter ("mean HP") 310 and a mean vertical frequency domain parameter ("mean VP") 320, for example. In other examples, the visual content classification value 324 can be the mean HP 310 or the mean VP 320.

The block classifier 160 includes a mean HP generator 302, which can compute a mean HP 310 for the first input block 214. The mean HP 310 for the first input block 214 can be a mean value of an HP 264A of the first input block 214 (e.g., as computed by the frequency domain parameter generator 158) and at least one second HP of at least one second input block that is horizontally adjacent to the first input block in the input image 154. The second input block can be, for example, block 213 and/or block 215, each of which is horizontally adjacent to block 214. For example, the mean HP 310 can be the mean (or average) value of HP 263A, HP 264A, and HP 265A. Both HP 263A and HP 265A are horizontally adjacent to HP 264A in the matrix of horizontal frequency domain parameters 250A, so either or both can be included in the mean calculation. In other examples, one or more other HPs 250A that are in the same row of the matrix 250A as the HP 264A can be included in the mean calculation. For example, each horizontally adjacent HP (e.g., HP 263A and HP 265A) can be included, and also each HP that is horizontally adjacent to another horizontally HP up to a predetermined threshold distance (e.g., HP 262A but not HP 261A if the distance is 2) can be included in the horizontal mean calculation.

The block classifier 160 also includes a mean VP generator 304, which can compute a mean VP 320 for the first input block 214. The mean VP 320 for the first input block 214 can be a mean value of an VP 264B of the first input block 214 (e.g., as computed by the frequency domain parameter generator 158) and at least one second VP of at least one second input block that is vertically adjacent to the first input block in the input image 154. The second input block can be, for example, block 209 and/or block 219, each of which is vertically adjacent to block 214. For example, the mean VP 310 can be the mean (or average) value of VP 259B, VP 264B, and VP 269A. Both VP 259B and VP 269B are horizontally adjacent to VP 264B in the matrix of vertical frequency domain parameters 250B, so either or both can be included in the mean calculation. In other examples, one or more other VPs 250B that are in the same column of the matrix 250B as the VP 264B can be included in the mean calculation. For example, each vertically adjacent VP (e.g., VP 259B and HP 269B) can be included, and also each VP that is vertically adjacent to another vertically VP up to a predetermined threshold distance (e.g., VP 254B) can be included in the vertical mean calculation.

If the particular block does not have an adjacent block in one or both of the directions, as can occur if the particular block is on the edge of the input image, then the missing block can be excluded from the mean calculation. Alternatively, the blocks on the edges of the input image can be excluded from the particular blocks, so that each of the particular blocks has adjacent blocks in both the horizontal and vertical directions.

A sum generator 322 can compute the visual content classification value 324 as a sum of the mean HP 310 and the mean VP 320. A visual content-specific threshold evaluator 326 can determine whether the visual content classification value 324 satisfies a visual content-specific threshold. The visual content-specific threshold can be satisfied if, for example, the visual content classification value 324 is greater than a threshold value. The threshold value can be, e.g., 30, 42, 50, or other suitable value. The threshold value can be determined empirically, e.g., by performing the operations of the visual content-sensitive encoding component 156 on a set of input images, and identifying values of the threshold value that produce desired results, such as encoded images 164 that are less than a desired size and depict text with at least a threshold sharpness.

If the visual content-specific threshold is satisfied (e.g., the visual content classification value 324 is greater than the threshold value), then a text-oriented encoding selector 328 can select a text-oriented encoding. Otherwise, the visual content-specific threshold is not satisfied (e.g., the visual content classification value 324 is less than or equal to the threshold value), and a graphics-oriented encoding selector 330 can select a graphics-oriented encoding.

The block classifier 160 can invoke the image encoder 162 using the selected encoding. The block classifier 160 can specify the selected encoding to the image encoder 162 as, for example, an encoder parameter, such as a compression or sharpness parameter, that causes an encoder to generate output images having higher sharpness and greater size can be used to encode textual images, and an encoder parameter that causes the encoder to generates output image having lower sharpness and smaller size can be used to encode non-textual (e.g., graphics) images. The text-oriented encoding parameters can include, for example, a parameter specifying a threshold minimum sharpness of a region of an encoded image, such that the threshold minimum sharpness produces readable text. Non-text-oriented encoding parameters can include a parameter specifying a threshold maximum sharpness of a region of an encoded image, for example. The threshold maximum sharpness can be, for example, a sharpness that enables the encoder 162 to achieve a desired level of compression while maintaining a threshold minimum amount of sharpness of text or fine detail in the encoded image. Alternatively or additionally, the block classifier 160 can invoke different encoders 162 for different encodings, in which case the encoder can be selected according to the selected encoding. For example, the block classifier 160 can invoke an encoder 162 that generates output images having higher sharpness and greater size if the selected encoding is a text-oriented encoding, or an encoder 162 that generates output images having lower sharpness and smaller size if the selected encoding is a graphics-oriented encoding.

FIG. 4 depicts a flow diagram of an example method 400 to classify blocks of an input image as being text-oriented or graphics-oriented, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a kernel of a hypervisor 120 as shown in FIG. 1 or by an executable code of a host machine 100 (e.g., host operating system 168 or firmware), a virtual machine 110 (e.g., guest operating system or virtual firmware), an external device (e.g., a PCI device), other executable code, or a combination thereof.

Method 400 may be performed by processing devices of a server device or a client device and may begin at block 410. At block 410, a host computer system 100 may identify a first block of a first image. The first block may include a plurality of pixel values. At block 420, the host computer system may Generate a frequency-based representation of the first block, where the frequency-based representation comprises a transformation matrix having a plurality of coefficients, where each coefficient specifies a weight of a respective frequency in the frequency-based representation of the first block. The host computer system may generate the frequency-based representation using a discrete cosine transformation on the first block, for example, or other suitable transformation from the spatial domain to the frequency domain.

At block 430, the host computer system may generate at least one frequency domain parameter of the first block, where each frequency domain parameter of the first block is generated in view of a sum of a plurality of the coefficients of the transformation matrix. The frequency domain parameter may include a horizontal frequency domain parameter generated as a function of an absolute sum of horizontal coefficients divided by a predetermined value, such that the horizontal coefficients are in a particular row of the transformation matrix. The particular row may be a bottom row of the transformation matrix. The absolute sum may be a sum of absolute values of the horizontal coefficients, for example.

The frequency domain parameter may include a vertical frequency domain parameter generated in view of an absolute sum of vertical coefficients divided by the predetermined value, such that the vertical coefficients are in a particular column of the transformation matrix. The visual content classification value may be generated as a function of a sum of the horizontal frequency domain parameter and the vertical frequency domain parameter. The particular column may be a rightmost column of the transformation matrix.

At block 440, the host computer system may generate a visual content classification value in view of the at least one frequency domain parameter of the first block. The host computer system may generate at least one mean frequency domain parameter of the first block, and each mean frequency domain parameter of the first block may include a mean value of (1) the frequency domain parameter of the first block and (2) at least one second frequency domain parameter. Each second frequency domain parameter may be a frequency domain parameter of a respective second block that is adjacent to the first block. The visual content classification value may then be generated from the at least one mean frequency domain parameter of the first block.

The mean frequency domain parameter of the first block may include a mean horizontal frequency domain parameter and a mean vertical frequency domain parameter, and the visual content classification value may be generated in view of a sum of the mean horizontal frequency domain parameter and the mean vertical frequency domain parameter.

The mean frequency domain parameter of the first block may include a mean horizontal frequency domain parameter of the first block, such that the at least one second block includes at least one horizontally-adjacent block that is horizontally-adjacent to the first block. The second frequency domain parameter may include at least one second horizontal frequency domain parameter, such that each second horizontal frequency domain parameter is of a respective horizontally-adjacent block.

The mean frequency domain parameter of the first block may include a mean vertical frequency domain parameter of the first block, where the at least one second block includes at least one vertically-adjacent block that is vertically-adjacent to the first block, and the second frequency domain parameter includes at least one second vertical frequency domain parameter. Each second vertical frequency domain parameter may be a vertical frequency domain parameter of a respective vertically-adjacent block.

At block 450, the host computer system may determine whether the visual content classification value satisfies a visual content-specific threshold, and select, in view of the determination, an encoding. The visual content classification value can satisfy the visual content-specific threshold if, for example, the visual content classification value is greater than a predetermined threshold value. The threshold value can be, e.g., 30, 42, 50, or other suitable value. If at block 450 the host computer system determines that the visual content classification value satisfies the visual content-specific threshold, then at block 450 the host computer system may select a text-oriented encoding. Otherwise, if at block 450 the host computer system determines that the visual content classification value does not satisfy the visual content-specific threshold, then at block 450, the host computer system select a graphics-oriented encoding.

At block 460, the host computer system may generate, using the selected encoding, an encoded block in view of the first block. For example, the host computer system may encode the first block using the selected encoding. At block 470, the host computer system may cause an image comprising the encoded block to be a rendered via an image rendering device. For example, the host computer system may cause the image to be rendered via a graphics processing unit and displayed on a display device of the host computer system. Alternatively or additionally, at block 470 the host computer system may send the image comprising the encoded block via a communication network to a client computer system, which can render the image via an image rendering device and display the rendered image on a display device of the client computer system. Responsive to completing the operations described herein above with reference to block 470, the method may terminate.

Figure 5:
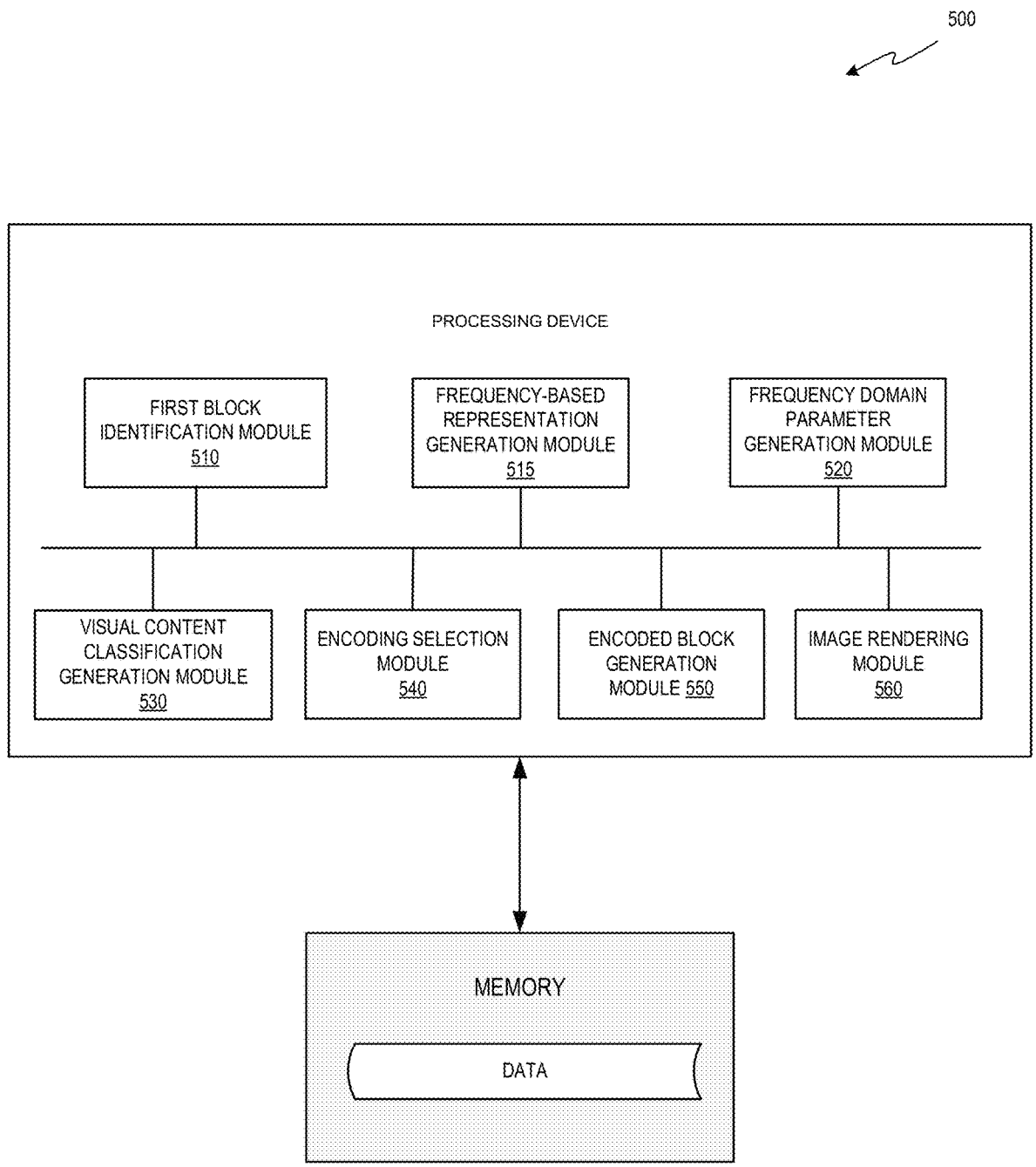
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computing device 100 of FIG. 1, and may include one or more processors and one or more memory devices. In the example shown, computer system 500 may include a first block identification module 510, a frequency-based representation generation module 515, a frequency domain parameter generation module 520, a visual content classification generation module 530, an encoding selection module 540, an encoded block generation module 550, and an image rendering module 560.

First block identification module 510 may enable a processor to identify a first block of a first image. Frequency-based representation generation module 515 may enable the processor to generate a frequency-based representation of the first block, where the frequency-based representation comprises a transformation matrix having a plurality of coefficients, where each coefficient specifies a weight of a respective frequency in the frequency-based representation of the first block.

Frequency domain parameter generation module 520 may enable the processor to generate at least one frequency domain parameter of the first block, where each frequency domain parameter of the first block is generated as a sum of a plurality of the coefficients of the transformation matrix. Visual content classification generation module 530 may enable the processor to generate a visual content classification value from the at least one frequency domain parameter of the first block.

Encoding selection module 540 may select, according to a determination of whether the visual content classification value satisfies a visual content-specific threshold, an encoding. Encoded block generation module 550 may generate, using the selected encoding, an encoded block from the first block, e.g., by encoding the first block using the selected encoding. Image rendering module 560 cause an image comprising the encoded block to be a rendered via an image rendering device.

Figure 6:
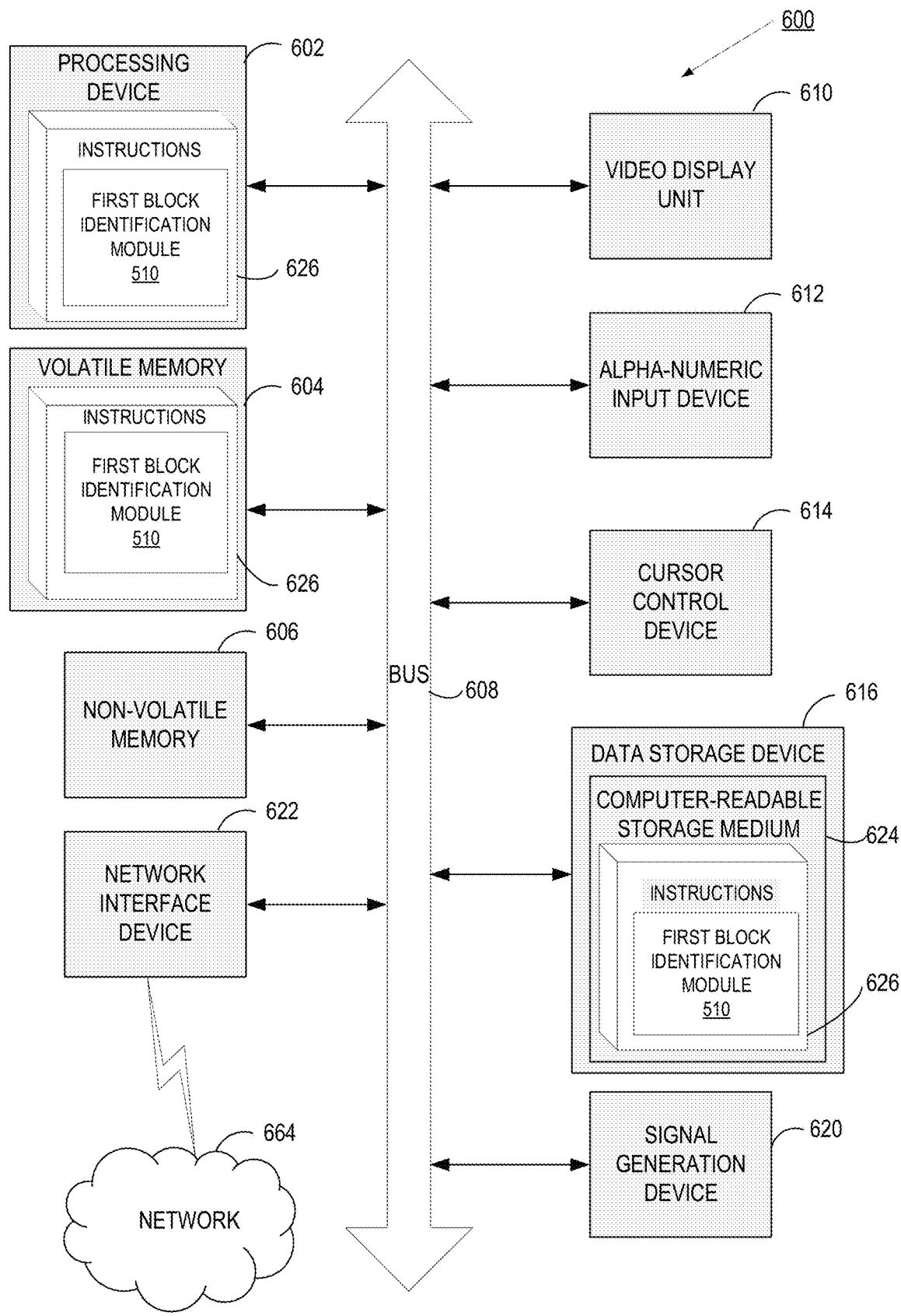
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computer system 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
    a memory device comprising a group of memory units; and
    a processing device, operatively coupled to the memory device, to perform operations comprising:
        identifying a first block of a first image, the first block comprising a plurality of pixel values;
        generating a frequency-based representation of the first block, wherein the frequency-based representation comprises a transformation matrix having a plurality of coefficients, wherein each coefficient specifies a weight of a respective frequency in the frequency-based representation of the first block;
        generating at least one frequency domain parameter of the first block comprising a horizontal frequency domain parameter generated in view of a sum of absolute values of horizontal coefficients divided by a predetermined value, wherein the horizontal coefficients are selected from two or more first sub-matrices of the transformation matrix;
        generating a visual content classification value in view of the at least one frequency domain parameter of the first block;
        selecting, in view of a determination of whether the visual content classification value satisfies a visual content-specific threshold, an encoding;
        generating, using the selected encoding, an encoded block in view of the first block; and
        causing an image comprising the encoded block to be a rendered via an image rendering device.

2. The system of claim 1, wherein generating the frequency-based representation comprises performing a discrete cosine transformation on the first block.

3. The system of claim 1, wherein the at least one frequency domain parameter reflects an amount of fine detail present in the first block.

4. The system of claim 1, wherein the two sub-matrices are of equal size and are separated by one or more columns.

5. The system of claim 1, wherein the at least one frequency domain parameter further comprises a vertical frequency domain parameter generated in view of a sum of absolute values of vertical coefficients divided by the predetermined value, wherein the vertical coefficients are selected from two or more second sub-matrices of the transformation matrix,
    wherein the visual content classification value is generated in view of a sum of the horizontal frequency domain parameter and the vertical frequency domain parameter, and
    wherein the second sub-matrices are transpositions of the first sub-matrices.

6. The system of claim 1, wherein the operations further comprise:
    identifying one or more changed blocks of the first image, wherein each of the one or more changed blocks is different from a corresponding block of a second image, wherein the second image is received prior to the first image, and wherein the first block is one of the one or more changed blocks.

7. The system of claim 1, wherein the operations further comprise:
    generating at least one mean frequency domain parameter of the first block, wherein each mean frequency domain parameter of the first block comprises a mean value of the frequency domain parameter determined for the first block and at least one second frequency domain parameter, wherein each second frequency domain parameter is determined for a respective second block that is adjacent to the first block,
    wherein the visual content classification value is generated in view of the at least one mean frequency domain parameter of the first block.

8. The system of claim 7, wherein the at least one mean frequency domain parameter of the first block comprises the horizontal frequency domain parameter and a mean vertical frequency domain parameter, and the visual content classification value is generated in view of a sum of the horizontal frequency domain parameter and the mean vertical frequency domain parameter.

9. The system of claim 7, wherein the at least one mean frequency domain parameter of the first block comprises the horizontal frequency domain parameter of the first block, wherein the respective second block comprises at least one horizontally-adjacent block that is horizontally-adjacent to the first block, and wherein the second frequency domain parameter comprises at least one second horizontal frequency domain parameter, wherein each second horizontal frequency domain parameter is of a respective horizontally-adjacent block.

10. The system of claim 7, wherein the at least one mean frequency domain parameter of the first block comprises a mean vertical frequency domain parameter of the first block, wherein the at least one second block comprises at least one vertically-adjacent block that is vertically-adjacent to the first block, and wherein the second frequency domain parameter comprises at least one second vertical frequency domain parameter, wherein each second vertical frequency domain parameter is of a respective vertically-adjacent block.

11. The system of claim 1, wherein the visual content classification value satisfies the visual content-specific threshold if the visual content classification value is greater than a predetermined threshold value.

12. The system of claim 1, wherein the selected encoding is a text-oriented encoding if the visual content classification value satisfies the visual content-specific threshold.

13. The system of claim 12, wherein the selected encoding is a graphics-oriented encoding if the visual content classification value does not satisfy the visual content-specific threshold, wherein the graphics-oriented encoding produces images having lower sharpness than the text-oriented encoding.

14. The system of claim 1, wherein the first image comprises a screen image of a computer system.

15. The system of claim 1, wherein at least two pixel values of the first block specify different colors.

16. The system of claim 1, wherein the first image comprises a desktop screen image.

17. A method comprising:
identifying a first block of a first image, the first block comprising a plurality of pixel values;
generating, by a processing device, a frequency-based representation of the first block, wherein the frequency-based representation comprises a transformation matrix having a plurality of coefficients, wherein each coefficient specifies a weight of a respective frequency in the frequency-based representation of the first block;
generating at least one frequency domain parameter of the first block comprising a horizontal frequency domain parameter generated in view of a sum of absolute values of horizontal coefficients divided by a predetermined value, wherein the horizontal coefficients are selected from two or more first sub-matrices of the transformation matrix;
generating a visual content classification value in view of the at least one frequency domain parameter of the first block;
selecting, in view of a determination of whether the visual content classification value satisfies a visual content-specific threshold, an encoding;
generating, using the selected encoding, an encoded block in view of the first block; and
causing an image comprising the encoded block to be a rendered via an image rendering device.

18. A non-transitory machine-readable storage medium storing instructions that cause a processing device to:
identify a first block of a first image, the first block comprising a plurality of pixel values;
generate, by the processing device, a frequency-based representation of the first block, wherein the frequency-based representation comprises a transformation matrix having a plurality of coefficients, wherein each coefficient specifies a weight of a respective frequency in the frequency-based representation of the first block;
generate at least one frequency domain parameter of the first block comprising a horizontal frequency domain parameter generated in view of a sum of absolute values of horizontal coefficients divided by a predetermined value, wherein the horizontal coefficients are selected from two or more first sub-matrices of the transformation matrix;
generate a visual content classification value in view of the at least one frequency domain parameter of the first block;
select, in view of a determination of whether the visual content classification value satisfies a visual content-specific threshold, an encoding;
generate, using the selected encoding, an encoded block in view of the first block; and
cause an image comprising the encoded block to be a rendered via an image rendering device.

* * * * *